(12) United States Patent
Leper et al.

(10) Patent No.: US 8,700,985 B2
(45) Date of Patent: Apr. 15, 2014

(54) COLLECTING USER FEEDBACK ABOUT WEB PAGES

(75) Inventors: Bartosz Leper, Luczyce (PL); Robert Michal Pociecha-Łoś, Kraków (PL); Boleslaw Szewczyk, Warsaw (PL); Joanna Chwastowska, Tarnów (PL); Przemyslaw Broniek, Kraków (PL); Jan Wróbel, Michalowice (PL); Terence Christopher Haddock, Kraków (PL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/164,062

(22) Filed: Jun. 20, 2011

(65) Prior Publication Data

US 2012/0324334 A1 Dec. 20, 2012

(51) Int. Cl.
*G06F 17/30* (2006.01)
(52) U.S. Cl.
USPC ............ 715/230; 715/234; 715/240; 715/760
(58) Field of Classification Search
USPC ......... 715/200, 201, 202, 203, 204, 205, 209, 715/210, 226, 227, 230, 231, 233, 234, 240, 715/249, 254, 255, 273, 700, 701, 702, 760, 715/762
See application file for complete search history.

(56) References Cited

U.S. PATENT DOCUMENTS

| | | | |
|---|---|---|---|
| 7,047,318 B1 * | 5/2006 | Svedloff | 709/246 |
| 7,584,435 B2 | 9/2009 | Bailey et al. | |
| 8,024,668 B2 * | 9/2011 | Nickerson et al. | 715/808 |
| 8,140,646 B2 * | 3/2012 | Mickens et al. | 709/219 |
| 2002/0188613 A1 * | 12/2002 | Chakraborty et al. | 707/100 |
| 2004/0019688 A1 * | 1/2004 | Nickerson et al. | 709/229 |
| 2004/0030697 A1 * | 2/2004 | Cochran et al. | 707/9 |
| 2004/0169678 A1 * | 9/2004 | Oliver | 345/738 |
| 2006/0253458 A1 * | 11/2006 | Dixon et al. | 707/10 |
| 2006/0253583 A1 | 11/2006 | Dixon et al. | |

(Continued)

FOREIGN PATENT DOCUMENTS

WO WO 2004/012049 A2 2/2004

OTHER PUBLICATIONS

Webpage for www.snapengage.com, TimZon, LLC, 2010, 1 page, [online][retrieved on Oct. 28, 2011] retrieved from the internet <URL:http://www.snapengage.com/>.
PCT International Search Report and Written Opinion, PCT/US2012/042445, Feb. 26, 2013, 7 Pages.

*Primary Examiner* — Maikhanh Nguyen
(74) *Attorney, Agent, or Firm* — Fenwick & West LLP (57) ABSTRACT

A user may desire to provide feedback on a web page displayed at a client. To collect feedback, a feedback module is provided to and executed at the client to provide feedback functionality. The feedback module creates a mask to prevent interaction with the original web page, clones the original web page, and displays a clone version in place of the masked original page. In addition, the feedback module creates an annotation frame to receive annotations of the clone version of the web page. A feedback report including a feedback image showing the clone version of the web page and the received annotations is generated by the module for submission to a server.

24 Claims, 7 Drawing Sheets

(56) References Cited

U.S. PATENT DOCUMENTS

2008/0209361 A1* 8/2008 Nickerson et al. ............ 715/808
2009/0187442 A1   7/2009 Kohanim et al.
2009/0292984 A1* 11/2009 Bauchot et al. ............... 715/234
2010/0042931 A1*  2/2010 Dixon et al. .................. 715/738
2010/0082747 A1*  4/2010 Yue et al. ...................... 709/204
2010/0257409 A1  10/2010 Aranwela et al.
2010/0312858 A1* 12/2010 Mickens et al. .............. 709/219
2011/0119571 A1*  5/2011 Decker et al. ................ 715/205

* cited by examiner

COLLECTING USER FEEDBACK ABOUT WEB PAGES

BACKGROUND

1. Field of Art

The present invention generally relates to the field of feedback collection and more specifically to collecting reports of issues with web pages viewed on computing devices.

2. Background of the Invention

Web pages and other types of content provided by websites are accessed over the Internet by users using a wide range of computing devices. Not all computing devices access the web content using the same computing environment or application. For example, the computing device maybe a mobile phone, computer, or tablet device, and each can use a different web browser to display the web content.

Occasionally, the web content contains errors of which the content provider is not aware. For example, code in the web content can cause a page to render correctly on some web browsers but incorrectly on others. In addition, the web content can have simple errors, such as typographical errors, that the content provider overlooked when producing the content. These errors are undesirable and can have a negative impact on the experience of the user consuming the web content.

Content providers include feedback links in the web content that users can use to submit feedback. The content providers can analyze the collected feedback to remediate the errors or otherwise improve the quality of the web content. However, some types of errors are difficult for users to report. For example, a web page rendering error might be difficult for a user to describe using textual feedback. While computing environments provide tools for capturing images of web pages, browser-based content (e.g., scripts in web pages) are prevented from accessing these tools for security reasons. As a result, content providers have difficulty collecting useful feedback about errors in their web content.

SUMMARY

The above and other issues are addressed by a method, non-transitory computer-readable storage medium, and computer system for collecting feedback for an original web page displayed at a client. An embodiment of the method comprises providing a feedback module to the client. The feedback module is executable at the client to perform steps comprising displaying a clone version of the original web page and receiving an annotation of the clone version of the original web page. The steps performed by the feedback module also comprise generating a feedback report including a feedback image showing the clone version of the original web page and the received annotation and submitting the feedback report.

An embodiment of the non-transitory computer-readable storage medium stores executable computer program instructions performing steps comprising providing a feedback module to the client. The feedback module is executable at the client to perform steps comprising displaying a clone version of the original web page and receiving an annotation of the clone version of the original web page. The steps performed by the feedback module also comprise generating a feedback report including a feedback image showing the clone version of the original web page and the received annotation and submitting the feedback report.

An embodiment of the computer system comprises a non-transitory computer-readable storage medium storing executable computer program instructions for performing steps comprising providing a feedback module to the client. The feedback module is executable at the client to perform steps comprising displaying a clone version of the original web page and receiving an annotation of the clone version of the original web page. The steps performed by the feedback module also comprise generating a feedback report including a feedback image showing the clone version of the original web page and the received annotation and submitting the feedback report. The computer system further comprises a processor for executing the computer program instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures.

Figure 1:
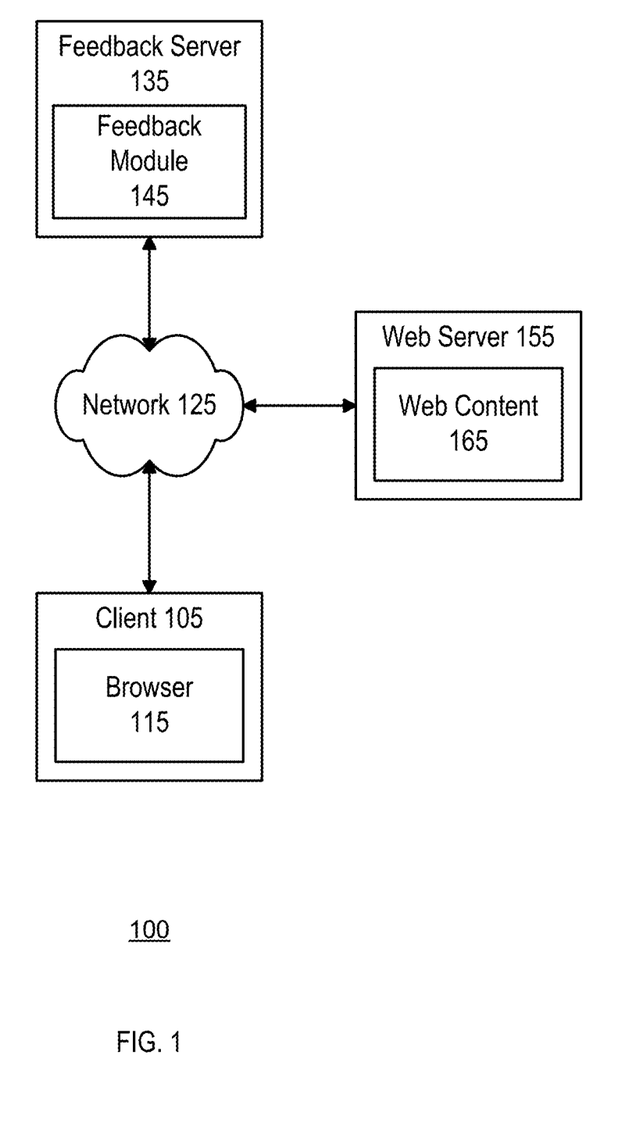
FIG. 1 is a high-level block diagram illustrating an environment for collecting user feedback according to one embodiment.

FIG. 1 is a high-level block diagram illustrating an environment 100 for collecting user feedback according to one embodiment. As shown, the environment 100 includes a network 125 connecting a client 105, a feedback server 135, and a web server 155. While only one client 105, one feedback server 135, and one web server 155 are shown in FIG. 1 for clarity, embodiments can have many clients 105 and multiple instances of the servers 135, 155. Additionally, in some embodiments, the feedback server 135 and web server 155 functionality may be consolidated on one server.

The client 105 is a computer or other electronic device used by one or more users to execute applications for performing various activities. For example the client 105 can be a desktop, notebook, or tablet computer, a mobile telephone, or television set-top box. The applications executed by the client 105 may include web browsers, word processors, media players, spreadsheets, image processors, security software, etc.

In the illustrated embodiment, the client 105 executes a browser 115. For example, the browser 115 may be a traditional web browsing application such as GOOGLE CHROME, MOZILLA FIREFOX, or MICROSOFT INTERNET EXPLORER. In other embodiments, the browser 115 may be incorporated into a media player, video game, widget, set-top box application, etc. The browser 115 includes functionality for retrieving web content 165 from web servers 155 on the network 125 and rendering the web content on a display of the client 105. The rendered web content 165 can include static content, such as text and images. The rendered web content 165 can also include active content, such as FLASH objects and code written in JavaScript or another programming language that is executed by the browser 115 to dynamically and programmatically update the web page.

The web server 155 hosts a variety of web content 165 made accessible to clients 105 on the network 125 by one or more content providers. The web content 165 can include, for example, hypertext markup language (HTML)-based web pages. Such pages include tags that describe other content, including the static content and the active content within the pages. A browser 115 renders the web page according to the tags.

In one embodiment, a content provider includes a feedback link in the web content 165. A user of a client 105 can use the feedback link to provide feedback about the web content 165 to the content provider. For example, a user may spot one or more errors in the web content 165 such as coding errors, rendering errors, unreadable typefaces, corrupted data, non-viewable content, or typographical errors that are unknown to the content provider. Through the feedback link, the user can provide a description of the error, including an image of the web content 165 containing the error, to the content provider.

In one embodiment, the feedback link, if selected by a user, causes the browser 115 to download a feedback module 145 from the feedback server 135 to the browser of the user's client 105. The feedback server 135 may be operated by the content provider or by a third party. The feedback module 145 is rendered by the browser 115 and provides functionality allowing the user to provide the feedback about the web content 165 to the content provider. In one embodiment, the feedback module 145 includes executable JavaScript code that causes the browser 115 to display a clone version of the web content 165 that the user can annotate by highlighting and/or redacting. In addition, the feedback module 145 allows the user to provide a textual description of the feedback and may also collect other data about the web content, browser 115, and/or client 105. Once the user has generated the feedback, the user can preview the feedback and submit the feedback, including the annotated web content, the textual description, and the other data, to the content provider. In one embodiment, the feedback module 145 provides the feedback to the feedback server 135 while in other embodiments the feedback is provided to the web server 155 and/or to another server on the network 125.

The network 125 represents the communication pathway between clients 105 and servers 135, 155. In one embodiment, the network 125 uses standard communications technologies and/or protocols and can include the Internet. Thus, the network 125 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 125 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 125 can be represented using technologies and/or formats including the hypertext markup language (HTML), the extensible markup language (XML), JavaScript, VBScript, FLASH, the portable document format (PDF), etc. In addition, all or some of the web content 165 and modules can be encrypted using conventional encryption technologies such as secure sockets layer (SSL), transport layer security (TLS), virtual private networks (VPNs), Internet Protocol security (IPsec), etc. In another embodiment, the entities on the network 125 can use custom and/or dedicated data communications technologies instead of, or in addition to, the ones described above.

Figure 2:
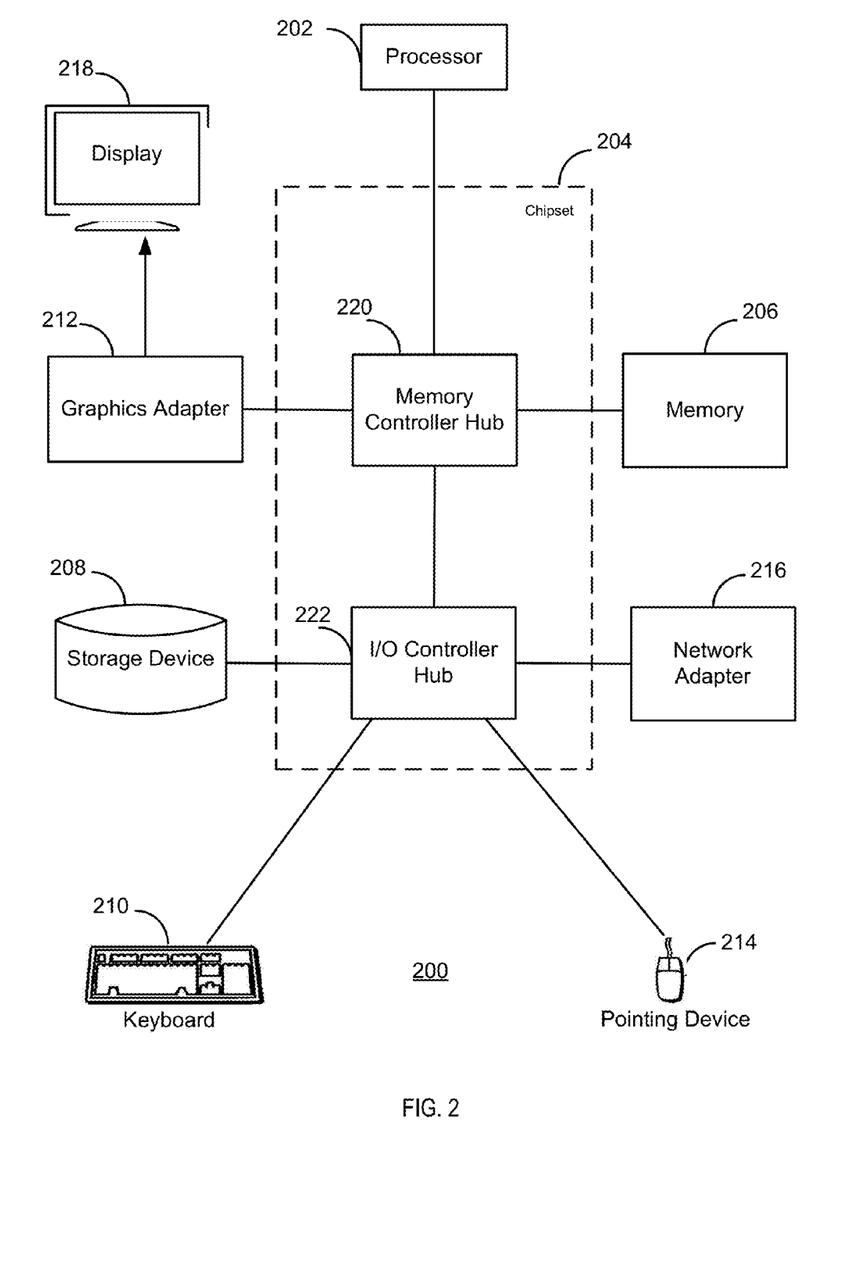
FIG. 2 is a high-level block diagram illustrating an example of a computer for use as a client and/or server according to one embodiment.

FIG. 2 is a high-level block diagram illustrating an example of a computer 200 for use as a client 105 and/or servers 135, 155 according to one embodiment. Illustrated are at least one processor 202 (CPU) coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 125. Some embodiments of the computer 200 have different and/or other components than those shown in FIG. 2. For example, the servers 135, 155 may be formed of multiple blade servers and lack a display device, keyboard, and other components.

As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202 as one or more processes.

Figure 3:
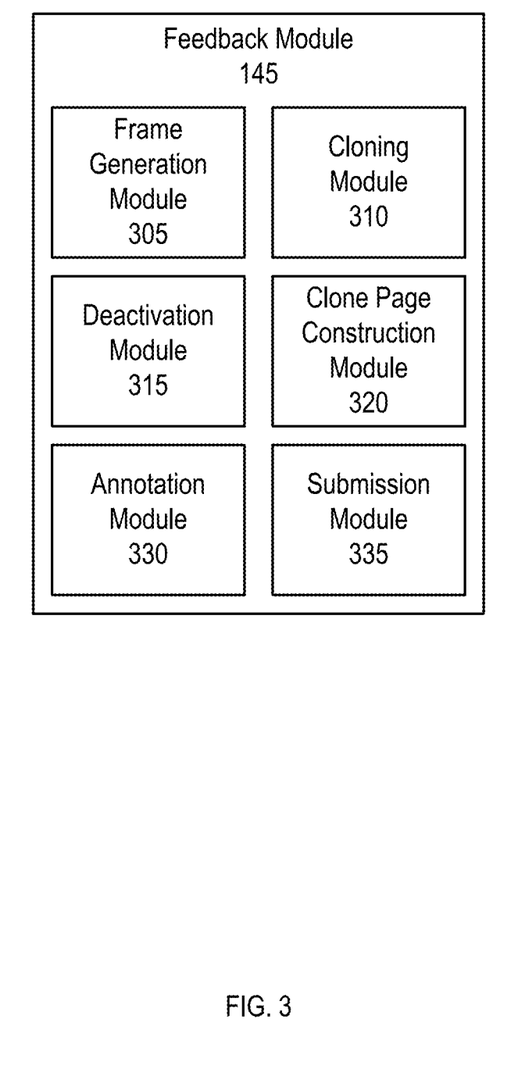
FIG. 3 is a high-level block diagram illustrating a detailed view of the feedback module according to one embodiment.

FIG. 3 is a high-level block diagram illustrating a detailed view of the feedback module 145 according to one embodiment. As mentioned above, the feedback module 145 may be downloaded from the feedback server 135 to the client 105 and executed within the browser 115 when the user of the client selects the "feedback" link on a web page. As shown in FIG. 3, the feedback module 115 itself includes multiple modules. In the embodiment shown in FIG. 3, the feedback module 115 includes a frame generation module 305 (the "frame module"), a cloning module 310, a deactivation module 315, a clone page construction module 320 (the "construction module"), an annotation module 330, and a submission module 335. In some embodiments, the functions are distributed among the modules in a different manner than described herein. Other embodiments have additional and/or other modules.

The frame module 305 creates multiple frames within the browser 115 to provide functionality used to collect feedback. In one embodiment, the frames are HTML iframe elements, with each frame providing one or more feedback functions. The frames are organized into multiple layers, such that content on a lower-level frame can be covered by overlaid content on a higher-layer frame. Each layer can contain one or more frames. The frame layers prevent undesired cross-talk and information sharing between the original web page for which feedback is being provided (i.e., the web content 165 rendered by the browser) and feedback reporting functions.

The frame module 305 creates a mask frame that functions as a mask over the original web page rendered by the browser 115. The mask covers and obscures the original web page, thereby preventing the user of the client 105 from seeing and/or interacting with it. The frame module 305 also creates a clone page display frame that covers the mask frame and displays clone web content cloned from the original web page. Additionally, the frame module 305 creates an annotation frame overlaid on the clone page display that holds user-supplied annotations. Additionally, the annotation frame can prevent the user of the client 105 from interacting with the clone web content in the clone page display frame. Further, the frame module 305 creates a feedback user interface (UI) frame overlaying a portion of the annotation frame that displays a user interface for selecting feedback functionality options and collecting a feedback description. Different embodiments can use different or additional frames than the ones described herein.

In some embodiments, the frame module 305 loads the content of the feedback UI frame from the domain of the feedback server 135. Loading the feedback UI frame separately prevents exploits in the system while allowing communication with the feedback server 135. Thus, the underlying web content 165 and clone page display are isolated from the feedback server 135. This isolation allows the feedback UI frame to freely communicate with the feedback server 135 while reducing the risk of malicious attacks against the feedback server 135, such as cross-site request forgery attacks.

The cloning module 310 interfaces with the browser 115 to produce a cloned copy of the web content 165 in the original web page rendered by the browser 115. The cloned copy is created in order to allow feedback functions to be performed on the cloned copy, rather than on the original web page. In some embodiments, the cloning module 310 clones content from within only the original web page's domain. For example, ads and other auxiliary content provided from domains other than the domain operated by the provider of the original web page are not included in the cloned copy. Thus, the cloned copy includes only errors resulting from the content provider's own content, and not errors introduced by auxiliary content providers.

In one embodiment, the cloning module 310 produces the cloned copy of the original web page by cloning the document object model (DOM) of the web page. The DOM is a tree-based data structure that describes the logical structure of the web page and the web content 165 contained therein. The cloning module 310 reads the DOM from the browser 115 and copies the DOM data while traversing the tree to produce the clone. Further, the cloning module 310 identifies any HTML "base" objects in the original web page and includes these tags in the cloned DOM so that any relative URLs specified in the DOM resolve correctly. If the original web page includes multiple frames, the cloning module 310 recursively performs the cloning process for each frame from the content provider's domain. However, the cloning module 310 excludes frames from other domains. The end result is a cloned DOM that can be used to recreate the original web page (minus any content excluded from the clone).

In addition, the cloning module 310 may identify and mark certain types of content in the original web page for exclusion during the cloning process. Thus, unwanted content may be excluded from the clone. For example, in one embodiment the cloning module 310 identifies and marks any scripts in the DOM for exclusion to prevent their execution during the cloning process. Any parent element containing the marked content is also marked. Accordingly, the cloning module 310 traverses the DOM tree to identify any nodes containing scripts and/or the scripts themselves. Once identified, a node and/or script itself is marked along with its parent nodes during the traversal. In one embodiment, an element in the DOM is marked by setting a custom attribute of the element to a specified value. The mark does not change the appearance of the original web page.

The cloning module 310 clones the unmarked elements of the DOM without alteration. For marked elements, the cloning module 310 interfaces with the deactivation module 315. The deactivation module 315 analyzes the marked content and, where appropriate, inserts substitute content into the DOM in place of the marked content. In one embodiment, the cloning module 310 provides the deactivation module 315 with a marked element. The deactivation module 315, in turn, recursively analyzes any child elements of the marked element to determine whether the child elements are marked. If the child elements are not marked, the deactivation module 310 returns the child elements to the cloning module 310 without alteration. When the deactivation module 315 encounters an element that includes a script or other unwanted content, the deactivation module returns substitute content instead of the marked content in the DOM to the cloning module 310.

Deactivating the scripts by returning substitute content ensures that the web content 165 does not activate during the cloning. Some browsers 115 automatically execute scripts on a web page when the DOM for the page is cloned. Activated web content could change the web page and/or perform malicious actions during cloning; deactivating the web content avoids these potential issues. Static (e.g. not changing) web content does not incur these potential issues during cloning. Thus, by transforming active content into static content, the cloned DOM may be created without altering the original web page and/or altering the visual appearance of the cloned web page.

In one embodiment, the deactivation module 315 deactivates the scripts in the clone by returning marked scripts as static "span" elements. For example, the deactivation module 315 may return marked scripts within the web page as static HTML elements with "span" tags. This change prevents the browser 115 from executing the active content while not changing the remainder of the web page. The deactivation module 315 also may alter any additional active content in the cloned DOM, such as embedded flash objects, to prevent their use and/or activation. Thus, the content in the cloned DOM appears as a static version of the original web page.

The construction module 320 interfaces with the browser 115 to construct a clone web page using the cloned copy of the original web page produced by the cloning module 310. In one embodiment, the clone web page is constructed in the clone page display frame generated by the frame generation module 305. The construction module 320 injects the HTML source from the cloned copy to the clone page display frame. The browser 115, in turn, renders the clone web page by fetching the web content 165 from the web server 155 according to the HTML.

The annotation module 330 includes functionality providing UI controls allowing the user of the client 105 to annotate the clone web page displayed in the clone page display frame. The annotation module 330 can support multiple types of annotation. In one embodiment, the annotation module 330 allows the user to highlight selected areas of the clone web page. Highlighted areas are visually distinguished from non-highlighted areas through the use of color, brightness, or another visual cue. In addition, an embodiment of the annotation module 330 allows the user to redact selected areas of the clone web page. The redacted areas are blacked out, blurred, or otherwise obscured to prevent the display of any visual information within the redacted area. The annotation module 330 displays the annotations (e.g., the highlighting or redaction) on the annotation frame generated by the frame generation module 305. An embodiment of the annotation module 330 also displays on the annotation frame a text box or other user interface element with which the user can provide a textual description of the problem for which feedback is being submitted or other information.

The submission module 335 provides a UI with controls allowing the user to submit the feedback report to the feedback server 135 or to another location. In one embodiment, at least some of the functionality associated with the UI controls is provided in the separate feedback UI frame by content downloaded from the feedback server 135 separately from the remainder of the feedback module 145. In one embodiment, the submission module 335 generates a feedback image showing the clone web page with the annotations provided by the user. The submission module 335 creates the feedback image by rendering the content of the clone page display and annotation frames onto a blank page.

Depending upon the embodiment, the submission module 335 may omit some of the information on the clone web page when rendering the feedback image. For example, the submission module 335 may omit text in non-highlighted areas of the clone web page from the feedback image. Omitting non-pertinent information allows the user to provide the feedback report without unnecessarily exposing unredacted private and/or non-pertinent information.

In addition, an embodiment of the submission module 335 displays the feedback image to the user responsive to the user selecting an option to preview the feedback report before submission. Further, in some embodiments the submission module 335 collects additional information about the original web page, browser 115, and/or client 105 for inclusion in the feedback report. The feedback module 145 may display all or some of this additional information to the user. The submission module 335 may also provide the user with one or more user interface elements with the preview of the feedback report for revising the submission, such as a "back" button, letting the user revise the annotations on the web page, a "cancel" button letting the user cancel the feedback submission, and a "send feedback" button to submit the report. As described above, in one embodiment the feedback report includes the feedback image, any textual information provided by the user, and any other information collected by the submission module 335. Other embodiments can include different and/or additional information in the feedback report.

Figure 4:
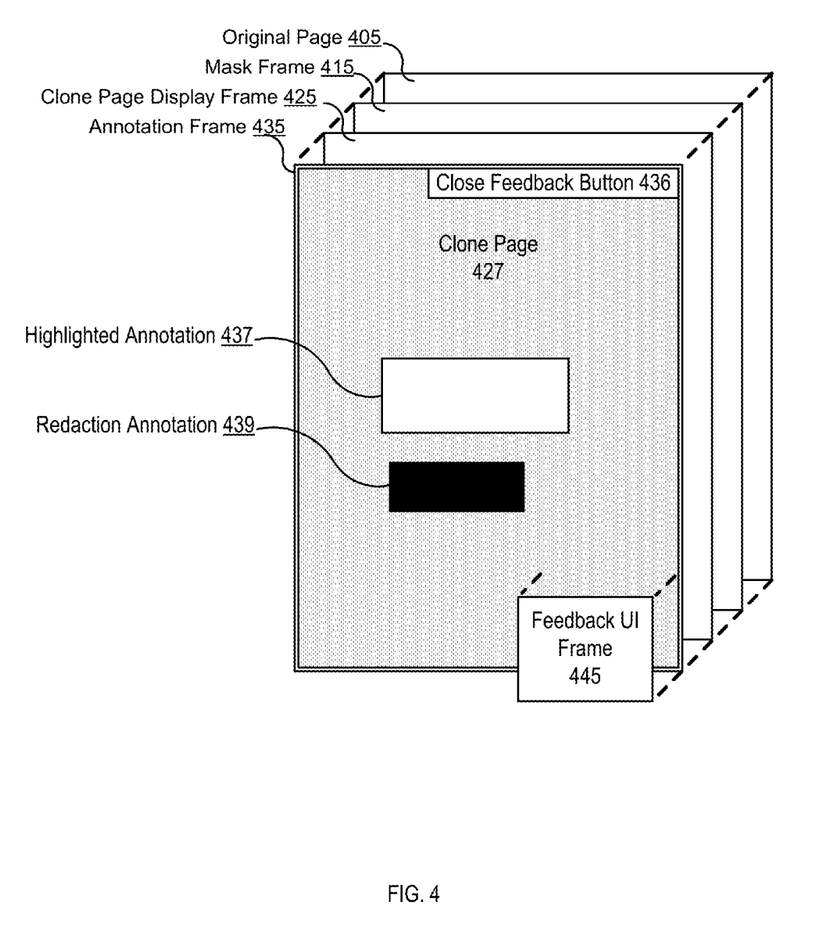
FIG. 4 is a high-level conceptual diagram illustrating a detailed view of the frames used by the feedback module according to one embodiment.

FIG. 4 is a high-level conceptual diagram illustrating a detailed view of the frames used by the feedback module 145 according to one embodiment. As discussed previously, the frame module 305 generates multiple layered frames to facilitate feedback collection. FIG. 4 illustrates the frames in their respective layers.

Specifically, FIG. 4 illustrates the original page 405 containing the web content 165 from the content provider. This page includes the content having the issue for which feedback is being submitted. A mask frame 415 overlays the original page 405 and obscures it. In one embodiment, the mask frame 415 is opaque and has the same spatial dimensions as the frame containing the original page 405. Hence, the user is unable to view the original page 405 through the mask frame 415.

The clone page display frame 425 is positioned on a layer above the mask frame 415 such that the clone page 427 is visually indistinguishable from the original page 405. That is, the clone page display frame 425 displays the clone page 427 cloned from the original page 405 above the mask frame 415. As a result, the user sees what appears to be the original page 405.

The annotation frame 435 overlays the clone page display frame 425. The annotation frame 435 is at least partially transparent and, therefore, the clone page 427 remains visible. Further, the annotation fame 435 prevents user interactions with the clone page 427. Thus, the user perceives the clone page 427 as a non-interactive, static replication of the original web page. In one embodiment, the annotation frame 435 is shaded and causes the clone page 427 to appear dimmed. Annotations are drawn on the annotation frame 435 and thus overlay the visible clone page 427. FIG. 4 shows a highlight annotation 437 highlighting an area on the clone page 427. The highlight annotation 437 is at least partially transparent so that the highlighted content on the clone page 427 is visible. For example, the highlight annotation 437 can be formed of an area that is less dimmed than the remainder of the annotation frame 435, such that the highlighted area appears brighter than the non-highlighted areas. FIG. 4 also shows a redaction annotation 439 redacting an area on the clone page 427. The redaction annotation 439 is not transparent and thus obscures the redacted area of the clone page 427. The annotation frame 435 may also include a close button 436 that allows the user to close the feedback module 145 and return to the original page 405, as well as annotation controls and other UI elements associated with the annotation process.

The feedback UI frame 445 overlays the annotation frame 435. The feedback module 145 loads the content of the feedback UI frame 445 from the feedback server 135. In one embodiment, the feedback UI frame 445 includes the UI controls for submitting the feedback.

Figure 5:
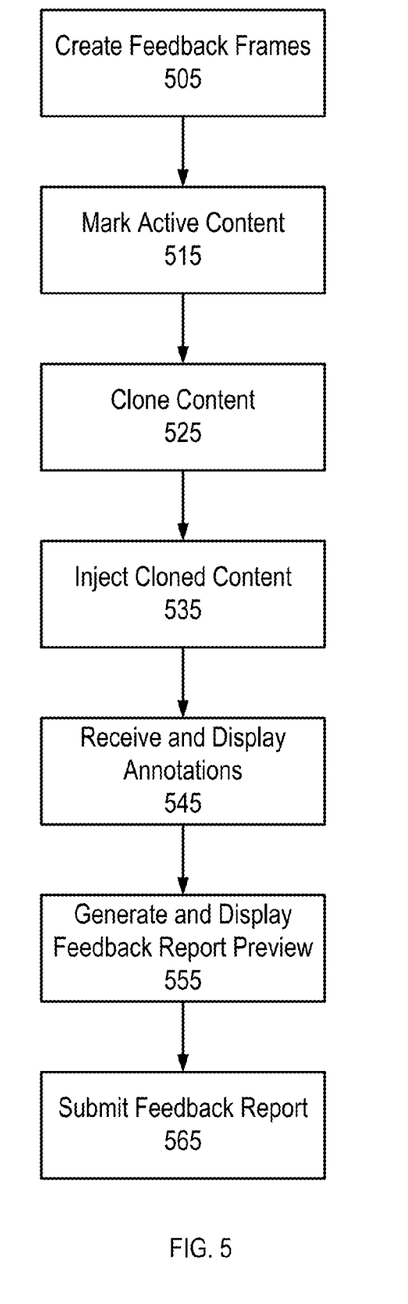
FIG. 5 is a flowchart illustrating a method for collecting and reporting feedback according to one embodiment.

FIG. 5 is a flowchart illustrating a method for collecting and reporting feedback according to one embodiment. Other embodiments can perform the steps of the method in different orders and can include different and/or additional steps. In addition, some or all of the steps can be performed by entities other than the feedback module 145.

The feedback module 145 is downloaded to, and executed by, the browser 115 displaying the original web page from the content provider for which the user is submitting feedback. Once executed, the feedback module 145 creates 505 the various frames to facilitate the feedback collection and reporting. Thus, the feedback module 145 creates a mask frame 415 that masks the original web page 405, and also creates a clone page display frame 425. The feedback module 145 marks 515 active content in the original web page for deactivation during the cloning process. The feedback module 145 clones 525 the content in the DOM of the original web page. When the feedback module 145 reaches marked content during the cloning 525, it returns the marked content as static content to the cloned DOM to prevent the marked content from executing during the cloning process.

The feedback module 145 injects 535 the cloned DOM into the clone page display frame 425, which causes the browser 115 to fetch the web content 165 for the page from the web server 155 and render a clone version of the web page. The feedback module 145 also displays the annotation UI which allows the user to annotate the clone version of the original web page. The feedback module 145 receives 545 and displays the annotations in the annotation frame 435 overlaid on the clone page display frame 425. The annotations can include highlighted content and/or redacted content. Once the user indicates that the feedback is ready for submission, the feedback module 145 generates and displays 555 a preview of the feedback report to the user for review and, upon receiving approval, submits 565 the feedback report to the feedback server 135 and/or another destination.

Figure 6:
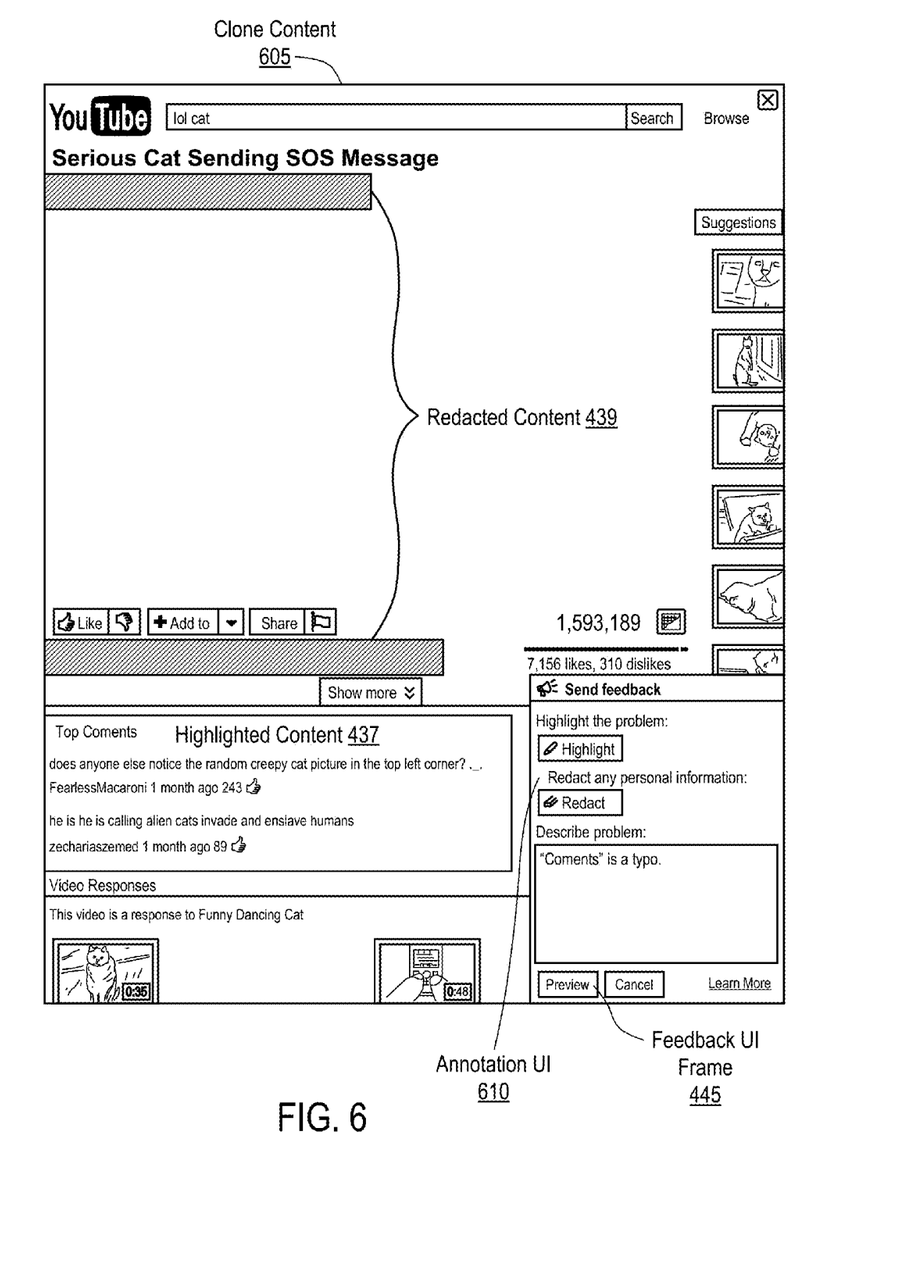
FIG. 6 is an example illustration of the feedback display generated by the feedback module according to one embodiment.

FIG. 6 is an example illustration of the feedback display generated by the feedback module 145 according to one embodiment. FIG. 6 illustrates a view of clone content 605 in the clone page 427 residing on the clone page display frame 425. The clone content 605 is dimmed by the overlaid annotation frame 435. FIG. 6 illustrates the annotation UI 610 allowing the user to add textual comments and select from annotations including highlight and redact. FIG. 6 also illustrates highlighted content 437 that is brighter than non-highlighted clone content 605, and redacted content 439 that is obscured. In addition, FIG. 6 illustrates the UI controls in the Feedback UI frame allowing the user to preview the feedback report, and/or cancel the feedback process.

Figure 7:
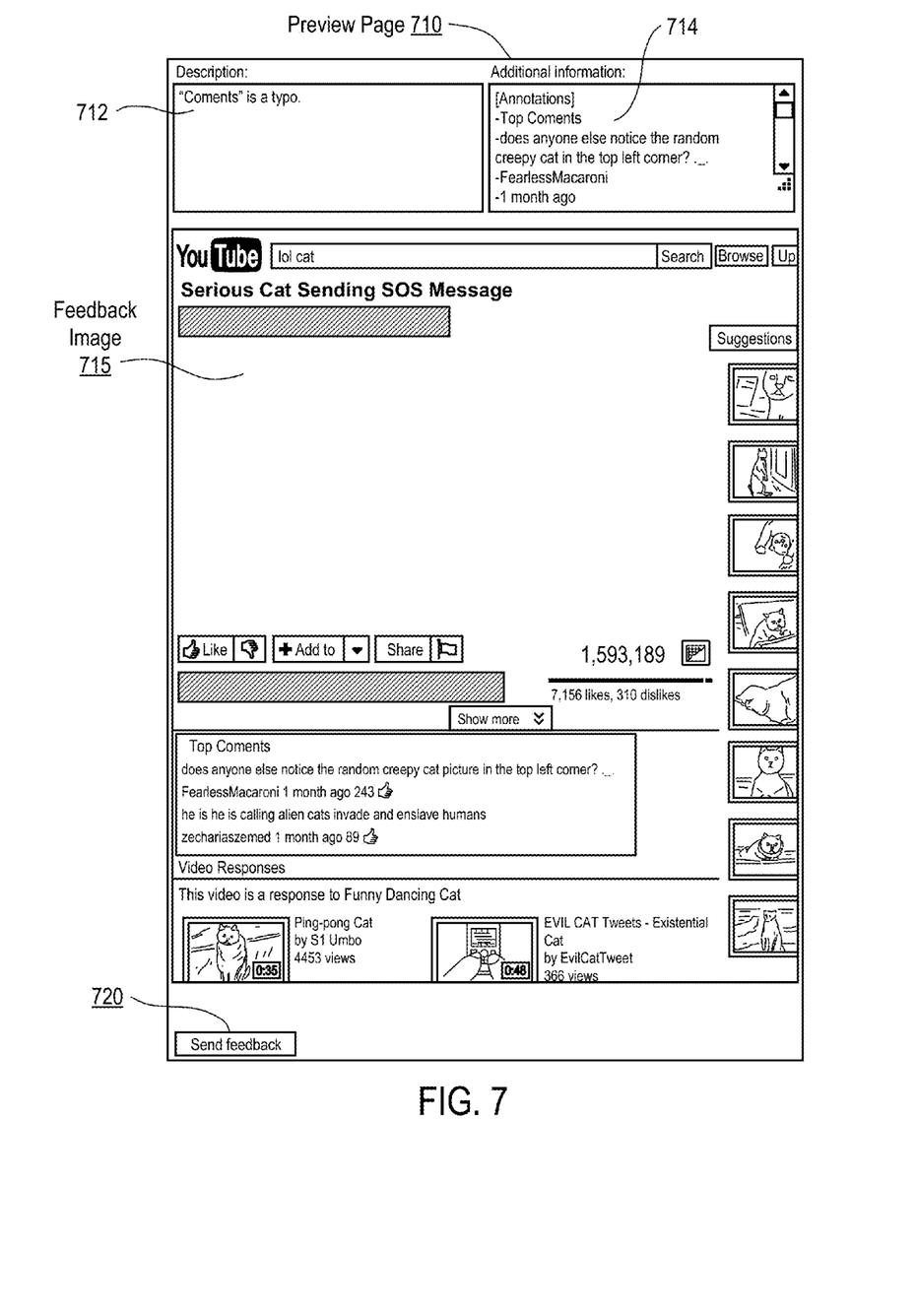
FIG. 7 is an example preview page generated by the feedback module according to one embodiment.

FIG. 7 is an example of a preview 710 page generated by the feedback module 145 according to one embodiment. The preview page 710 allows the user to review feedback report information and content before submitting the feedback report. The preview page contains "description" section 712 containing the textual feedback provided by the user, as well as "additional information" 714 collected from the page, such as text within a highlight annotation. The preview page 710 also includes a feedback image 715 showing the clone content 427 with the annotations made by the user, as well as a "send feedback" button 720 by which the user can submit the feedback report.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed:

1. A computer-implemented method of collecting feedback for an original web page displayed at a client, the method comprising:
   providing a feedback module to the client, the feedback module executable at the client to perform steps comprising:
      deactivating active content in the original web page;
      cloning web content including the deactivated active content in the original web page;
      injecting the cloned web content into a clone page display frame to display a clone version of the original web page;
      creating an annotation display frame overlaying the clone page display frame displaying the clone version of the original web page;
      providing a user interface enabling a user of the client to provide an annotation of the clone version of the original web page;
      receiving an annotation of the clone version of the original web page;
      visually displaying the received annotation in the annotation display frame in connection with the clone version of the original web page;
      generating a feedback report including a feedback image showing the clone version of the original web page and the received annotation; and
      submitting the feedback report.

2. The computer-implemented method of claim 1, wherein displaying a clone version of the original web page comprises creating a mask frame in a browser executing on the client that overlays and obscures a browser frame containing the original web page, the clone page display frame overlaying the mask frame to display the clone version of the original web page.

3. The computer-implemented method of claim 1, wherein deactivating the active content in the original web page is performed during the cloning and comprises transforming one or more marked scripts in the original web page into static elements to prevent execution of scripts in the original web page.

4. The computer-implemented method of claim 1, wherein the annotation display frame dims the clone version of the original web page, the user interface enables the user of the client to highlight a region of the clone version of the original web page, and visually displaying the received annotation comprises the annotation display frame not dimming the highlighted region of the clone version of the original web page.

5. The computer-implemented method of claim 1, wherein the user interface enables the user of the client to redact a region of the clone version of the original web page and visually displaying the received annotation comprises obscuring the redacted region.

6. The computer-implemented method of claim 1, wherein the feedback module is provided to the client by a feedback server via a network and the feedback report is submitted to the feedback server via the network.

7. The computer-implemented method of claim 1, wherein cloning web content in the original web page comprises identifying base objects associated with the domain of the original web page and including the identified base objects in the cloned web content.

8. The computer-implemented method of claim 1, wherein deactivating the active content in the original web page comprises marking active content in a document object model (DOM) of the original web page for deactivation prior to cloning.

9. The computer-implemented method of claim 1, wherein cloning the web content in the original web page comprises cloning a document object model (DOM) of the original web page to a clone DOM for injection into the clone page display frame, cloning the DOM of the original page comprising returning marked active content as static content to prevent execution of the active content.

10. A non-transitory computer-readable storage medium storing executable computer program instructions for collecting feedback for an original web page displayed at a client, the instructions performing steps comprising:
   providing a feedback module to the client, the feedback module executable at the client to perform steps comprising:
      deactivating active content in the original web page;
      cloning web content including the deactivated active content in the original web page;
      injecting the cloned web content into a clone page display frame to display a clone version of the original web page;
      creating an annotation display frame overlaying the clone page display frame displaying the clone version of the original web page;
      providing a user interface enabling a user of the client to provide an annotation of the clone version of the original web page;
      receiving an annotation of the clone version of the original web page;

visually displaying the received annotation in the annotation display frame in connection with the clone version of the original web page;

generating a feedback report including a feedback image showing the clone version of the original web page and the received annotation; and submitting the feedback report.

11. The computer-readable storage medium of claim 10, wherein displaying a clone version of the original web page comprises creating a mask frame in a browser executing on the client that overlays and obscures a browser frame containing the original web page, the clone page display frame overlaying the mask frame to display the clone version of the original web page.

12. The computer-readable storage medium of claim 10, wherein deactivating the active content in the original page is performed during the cloning and comprises transforming one or more marked scripts in the original web page into static elements to prevent execution of scripts in the original web page.

13. The computer-readable storage medium of claim 10, wherein the annotation display frame dims the clone version of the original web page, the user interface enables the user of the client to highlight a region of the clone version of the original web page, and visually displaying the received annotation comprises the annotation display frame not dimming the highlighted region of the clone version of the original web page.

14. The computer-readable storage medium of claim 10, wherein the user interface enables the user of the client to redact a region of the clone version of the original web page and visually displaying the received annotation comprises obscuring the redacted region.

15. The computer-readable storage medium of claim 10, wherein the feedback module is provided to the client by a feedback server via a network and the feedback report is submitted to the feedback server via the network.

16. The computer-readable storage medium of claim 10, wherein cloning web content in the original web page comprises identifying base objects associated with the domain of the original web page and including the identified base objects in the cloned web content.

17. The computer-readable storage medium of claim 10, wherein deactivating the active content in the original web page comprises marking active content in a document object model (DOM) of the original web page for deactivation prior to cloning.

18. The computer-readable storage medium of claim 10, wherein cloning the web content in the original web page comprises cloning a document object model (DOM) of the original web page to a clone DOM for injection into the clone page display frame, cloning the DOM of the original page comprising returning marked active content as static content to prevent execution of the active content.

19. A computer system for collecting feedback for an original web page displayed at a client, the computer system comprising:

a non-transitory computer-readable storage medium storing executable computer program instructions for performing steps comprising:

providing a feedback module to the client, the feedback module executable at the client to perform steps comprising:

deactivating active content in the original web page;

cloning web content including the deactivated active content in the original web page;

injecting the cloned web content into a clone page display frame to display a clone version of the original web page;

creating an annotation display frame overlaying the clone page display frame displaying the clone version of the original web page;

providing a user interface enabling a user of the client to provide an annotation of the clone version of the original web page;

receiving an annotation of the clone version of the original web page;

visually displaying the received annotation in the annotation display frame in connection with the clone version of the original web page;

generating a feedback report including a feedback image showing the clone version of the original web page and the received annotation; and submitting the feedback report; and a processor for executing the computer program instructions.

20. The computer system of claim 19, wherein displaying a clone version of the original web page comprises creating a mask frame in a browser executing on the client that overlays and obscures a browser frame containing the original web page, the clone page display frame overlaying the mask frame to display the clone version of the original web page.

21. The computer system of claim 19, wherein deactivating the active content in the original web page is performed during the cloning and comprises transforming one or more marked scripts in the original web page into static elements to prevent execution of scripts in the original web page.

22. The computer system of claim 19, wherein the annotation display frame dims the clone version of the original web page, the user interface enables the user of the client to highlight a region of the clone version of the original web page, and visually displaying the annotation comprises the annotation display frame not dimming the highlighted region of the clone version of the original web page.

23. The computer system of claim 19, wherein the user interface enables the user of the client to redact a region of the clone version of the original web page and visually displaying the received annotation comprises obscuring the redacted region.

24. The computer system of claim 19, wherein the feedback module is provided to the client by a feedback server via a network and the feedback report is submitted to the feedback server via the network.

* * * * *